United States Patent
Tatsukami et al.

(10) Patent No.: US 7,254,013 B2
(45) Date of Patent: Aug. 7, 2007

(54) PANEL MEMBER UNIT

(75) Inventors: Ikki Tatsukami, Kawasaki (JP);
Minoru Kumagai, Kawasaki (JP);
Nagahisa Chikazawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 235 days.

(21) Appl. No.: 10/870,001

(22) Filed: Jun. 18, 2004

(65) Prior Publication Data
US 2005/0151041 A1 Jul. 14, 2005

(30) Foreign Application Priority Data
Jan. 9, 2004 (JP) .............................. 2004-004455

(51) Int. Cl.
*G06F 1/16* (2006.01)
(52) U.S. Cl. ........................ 361/681; 349/58
(58) Field of Classification Search ................. 349/58; 361/681
See application file for complete search history.

(56) References Cited
U.S. PATENT DOCUMENTS 6,330,148 B1 * 12/2001 Won et al. .................. 361/681
6,559,908 B2 * 5/2003 Hiratsuka et al. ............. 349/58
6,780,030 B2 * 8/2004 Yoshinaga et al. ............ 439/92
2002/0195923 A1 12/2002 Won et al.
2003/0007109 A1 1/2003 Park
2004/0239828 A1 * 12/2004 Cho ............................ 349/58
2005/0116913 A1 6/2005 Ha et al.

FOREIGN PATENT DOCUMENTS

| JP | 2001-255511 | 9/2001 |
| JP | 2002-0054069 | 7/2002 |
| JP | 2002-350807 | 12/2002 |
| JP | 2003-0005660 | 1/2003 |
| JP | 2003-29244 | 1/2003 |
| JP | 2003-167231 | 6/2003 |

* cited by examiner

*Primary Examiner*—Lisa Lea-Edmonds
*Assistant Examiner*—Anthony Q. Edwards
(74) *Attorney, Agent, or Firm*—Arent Fox LLP

(57) ABSTRACT

An attachment member is coupled to a panel member at the peripheral outward surface of the panel member. A predetermined coupling mechanism serves to establish the connection. The attachment member receives an attached component behind the panel member. No urging forces are thus applied to the panel member in the direction perpendicular to the back surface of the panel member when the attachment member is coupled to the panel member. The panel member can reliably be prevented from suffering from damages or breakage.

25 Claims, 9 Drawing Sheets

PANEL MEMBER UNIT

BACKGROUND OF THE INVENTION

1. Field of the Invention

The present invention relates to a panel member unit including a panel member and a frame member coupled to the peripheral outward surface of the panel member.

2. Description of the Prior Art

A notebook type personal computer is well known. The notebook type personal computer includes a display enclosure coupled to main equipment for swinging movement. A panel member unit, namely a liquid crystal display (LCD) panel unit, is enclosed within the display enclosure. The LCD panel unit includes a fluorescent tube designed to provide the LCD panel with light. An attached component such as an inverter board is connected to the LCD panel unit. The inverter board functions to supply electric power to the fluorescent tube.

The inverter board is coupled directly to the rear cover of the LCD panel as disclosed in Japanese Patent Application Publication No. 2003-167231. Screws are screwed into the cover of the LCD panel so as to fix the inverter board on the LCD panel. The screws are oriented in the direction perpendicular to the back surface of the LCD panel. When the screws are screwed into the LCD panel in this direction, a larger stress is applied to the LCD panel. The LCD panel sometimes breaks up. In view of this larger stress, the inverter board should carefully be attached to the LCD panel. Attachment of the inverter board faces a lower efficiency in the production process.

Otherwise, the inverter board may be attached to the display enclosure. In this case, the inverter board is coupled to the display enclosure prior to the attachment of the LCD panel unit. Wires from the LCD panel unit are then connected to the inverter board. The LCD panel unit must be kept in the upright attitude on a working table when the wires are connected to the LCD panel unit. Alternatively, a worker must hold the LCD panel unit in the air with his hands. The worker faces a lower efficiency in the attachment of the inverter board.

SUMMARY OF THE INVENTION

It is accordingly an object of the present invention to provide a panel member unit and an electronic apparatus contributing to an easy attachment of an attached component without suffering from damages or breakage of the panel member. It is also an object of the present invention to provide an attachment member greatly contributing to realization of such a panel member unit and an electronic apparatus.

According to a first aspect of the present invention, there is provided a panel member unit comprising: a panel member; and an attachment member coupled to the panel member at the peripheral outward surface of the panel member with a predetermined coupling mechanism, said attachment member receiving an attached component behind the panel member.

The panel member unit allows the attachment member to couple with the panel member at the peripheral outward surface upright to the back surface of the panel member. No urging forces are thus applied to the panel member in the direction perpendicular to the back surface of the panel member when the attachment member is coupled to the panel member. The panel member can reliably be prevented from suffering from damages or breakage. The attachment member may be coupled to a frame member fixedly placed on the peripheral outward surface of the panel member, for example.

The coupling mechanism may comprise: a screw bore formed in the frame member in a direction perpendicular to the peripheral outward surface of the panel member; and a screw screwed into the screw bore after penetrating through the attachment member. The screw is screwed into the screw bore in the direction perpendicular to the peripheral outward surface of the panel member. No urging forces are thus applied to the panel member in the direction perpendicular to the back surface of the panel member.

The attachment member may comprise: a bracket superposed on the peripheral outward surface of the panel member and coupled to the frame member with the screw; a carrying member carrying the attached component and designed to move on the bracket along a guide passage extending on the back surface of the panel member; and a restraint mechanism designed to restrain the movement of the carrying member in the guide passage.

The panel member unit allows the carrying member to move on the bracket along the guide passage extending on the back surface of the panel member, when the bracket and the carrying member are coupled with each other. No urging forces are thus applied to the panel member in the direction perpendicular to the back surface of the panel member. The panel member can reliably be prevented from suffering from damages or breakage. Easy attachment of the carrying member can be realized in this manner. Additionally, the restraint mechanism may avoid drop or removal of the carrying member from the bracket. The carrying member can reliably be held on the bracket.

A screw bore may be formed in the bracket in a direction perpendicular to the back surface of the panel member in the panel member unit. The bracket can be coupled to an enclosure or else with a screw. The bracket may be made of a metal plate, for example.

The panel member may be a display panel, for example. In this case, the attached component may be an inverter board connected to the display panel, for example. Here, the carrying member may be made of an insulating material. The carrying member made of the insulating material serves to reliably insulate the display panel and the inverter board.

According to a second aspect of the present invention, there is provided an electronic apparatus comprising: an enclosure; a display panel contained within the enclosure; and an attachment member coupled to the display panel at the peripheral outward surface of the display panel by utilizing a predetermined coupling mechanism, said attachment member receiving an attached component behind the display panel.

The electronic apparatus allows the attachment member to couple with the display panel at the peripheral outward surface upright to the back surface of the display panel. No urging forces are thus applied to the display panel in the direction perpendicular to the back surface of the display panel when the attachment member is coupled to the display panel. The display panel can reliably be prevented from suffering from damages or breakage. The attachment member may be coupled to a frame member fixedly placed on the peripheral outward surface of the display panel, for example.

The coupling mechanism may comprise: a screw bore formed in the frame member in a direction perpendicular to the peripheral outward surface of the display panel; and a screw screwed into the screw bore after penetrating through the attachment member. The screw is screwed into the screw bore in the direction perpendicular to the peripheral outward surface of the display panel. No urging forces are thus applied to the display panel in the direction perpendicular to the back surface of the display panel.

The attachment member may comprise: a bracket superposed on the peripheral outward surface of the display panel and coupled to the frame member with the screw; a carrying member carrying the attached component and designed to move on the bracket along a guide passage extending on the back surface of the display panel; and a restraint mechanism designed to restrain the movement of the carrying member in the guide passage.

The electronic apparatus allows the carrying member to move on the bracket along the guide passage extending on the back surface of the display panel, when the bracket and the carrying member are coupled with each other. No urging forces are thus applied to the display panel in the direction perpendicular to the back surface of the display panel. The display panel can reliably be prevented from suffering from damages or breakage. Easy attachment of the carrying member can be realized in this manner. Additionally, the restraint mechanism may avoid drop or removal of the carrying member from the bracket. The carrying member can reliably be held on the bracket.

A screw bore may be formed in the bracket in a direction perpendicular to the back surface of the display panel. If the bracket is allowed to extend outside the display panel, for example, the display panel can be coupled to an enclosure or else with a screw in an easier manner. The bracket may be made of a metal plate, for example. Additionally, no urging forces are applied to the display panel in the direction perpendicular to the back surface of the display panel. The bracket may be made of a metal plate, for example.

The attached component may be an inverter board connected to the display panel, for example. In this case, the carrying member may be made of an insulating material. The carrying member made of the insulating material serves to reliably insulate the display panel and the inverter board.

According to a third aspect of the present invention, there is provided an attachment member coupled to a panel member at the peripheral outward surface upright to the back surface of the panel member, said attachment member designed to receive an attached component behind the panel member.

No urging forces are thus applied to the panel member in the direction perpendicular to the back surface of the panel member when the attachment member is coupled to the panel member. The panel member can reliably be prevented from suffering from damages or breakage. The attachment member may be coupled to a frame member fixedly placed on the peripheral outward surface of the panel member, for example.

The coupling mechanism may comprise: a screw bore formed in the frame member in a direction perpendicular to the peripheral outward surface of the panel member; and a screw screwed into the screw bore after penetrating through the attachment member. The screw is screwed into the screw bore in the direction perpendicular to the peripheral outward surface of the panel member. No urging forces are thus applied to the panel member in the direction perpendicular to the back surface of the panel member.

The attachment member may comprise: a bracket superposed on the peripheral outward surface of the panel member and coupled to the frame member with the screw; a carrying member carrying the attached component and designed to move on the bracket along a guide passage extending on the back surface of the panel member; and a restraint mechanism designed to restrain the movement of the carrying member in the guide passage.

The panel member unit allows the carrying member to move on the bracket along the guide passage extending on the back surface of the panel member, when the bracket and the carrying member are coupled with each other. No urging forces are thus applied to the panel member in the direction perpendicular to the back surface of the panel member. The panel member can reliably be prevented from suffering from damages or breakage. Easy attachment of the carrying member can be realized in this manner. Additionally, the restraint mechanism may avoid drop or removal of the carrying member from the bracket. The carrying member can reliably be held on the bracket.

A screw bore may be formed in the bracket in a direction perpendicular to the back surface of the panel member. The bracket can be coupled to an enclosure or else with a screw. The bracket may be made of a metal plate, for example.

A display panel may be employed as the panel member, for example. In this case, the attached component may be an inverter board connected to the display panel, for example. Here, the carrying member may be made of an insulating material. The carrying member made of the insulating material serves to reliably insulate the display panel and the inverter board.

BRIEF DESCRIPTION OF THE DRAWINGS

The above and other objects, features and advantages of the present invention will become apparent from the following description of the preferred embodiment in conjunction with the accompanying drawings, wherein.

DESCRIPTION OF THE PREFERRED EMBODIMENT

Figure 1:
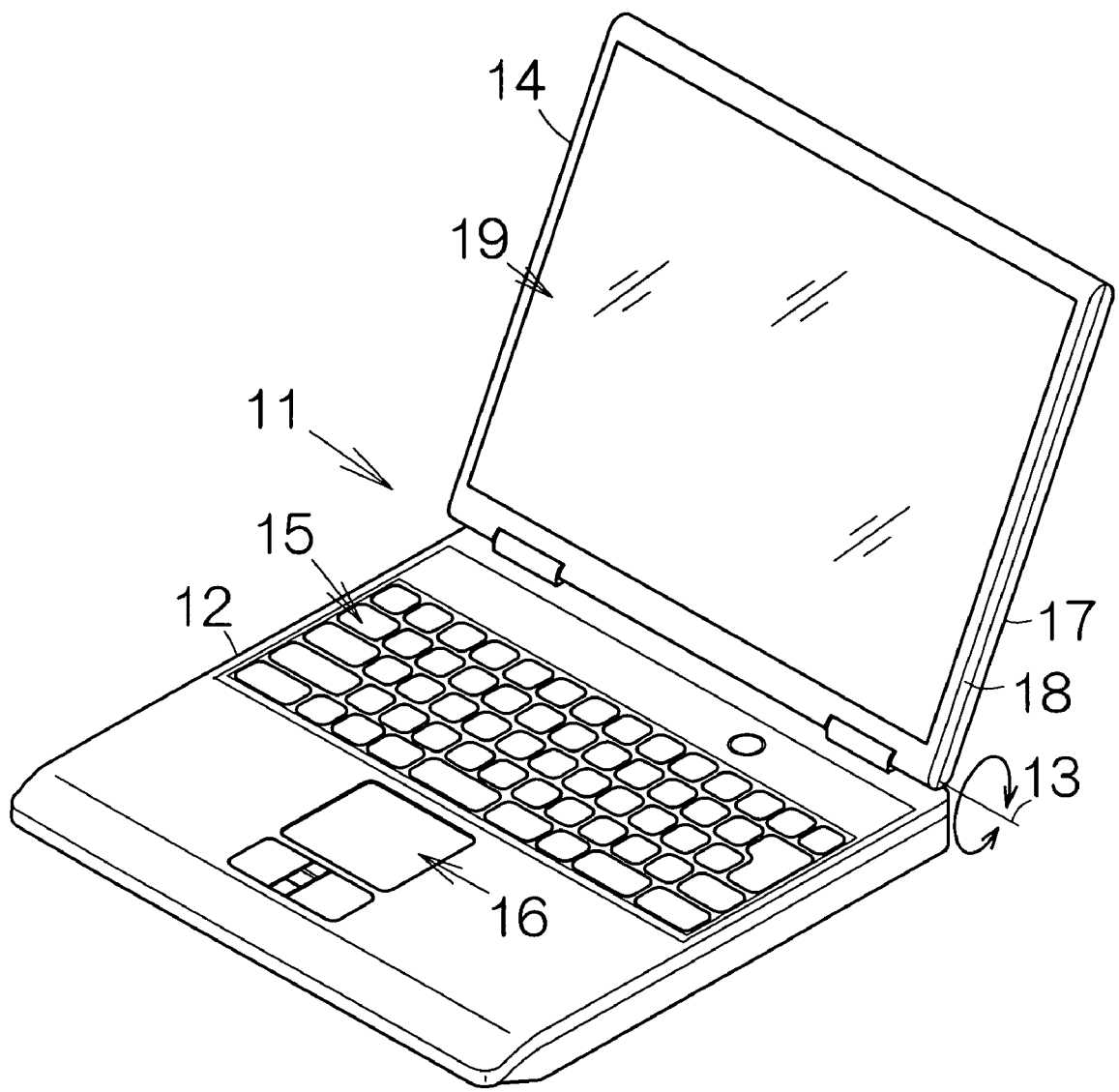
FIG. 1 is a perspective view schematically illustrating the overall structure of a notebook type personal computer as a specific example of an electronic apparatus.

FIG. 1 schematically illustrates a notebook type personal computer 11 as an electronic apparatus. The personal computer 11 includes thin main equipment 12. A motherboard, not shown, is incorporated within an enclosure of the main equipment 12. As conventionally known, major operating circuits such as a central processing unit (CPU), a memory, and the like, are mounted on the motherboard, for example. The CPU in general executes processing operation based on an operating system (OS) as well as an application software temporarily stored in the memory. An operator is allowed to manipulate input devices such as a keyboard 15 and a pointing device 16 mounted on the main equipment 12 so as to input various data and instructions to be supplied to the CPU.

A display enclosure 14 is coupled to the main equipment for relative swinging movement around a rotation axis 13. The display enclosure 14 includes a base 17 and a frame-shaped cover 18 covered over the base 17. A rectangular liquid crystal display (LCD) panel unit 19 is placed in a space between the cover 18 and the base 17. Graphics and texts are displayed on the screen of the LCD panel unit 19 based on the processing operation of the CPU. The cover 18 and the base 17 may be made of a resin material such as polycarbonate, a metal material such as magnesium, or the like. Dies may be utilized to form the cover 18 and the base 17.

Figure 2:
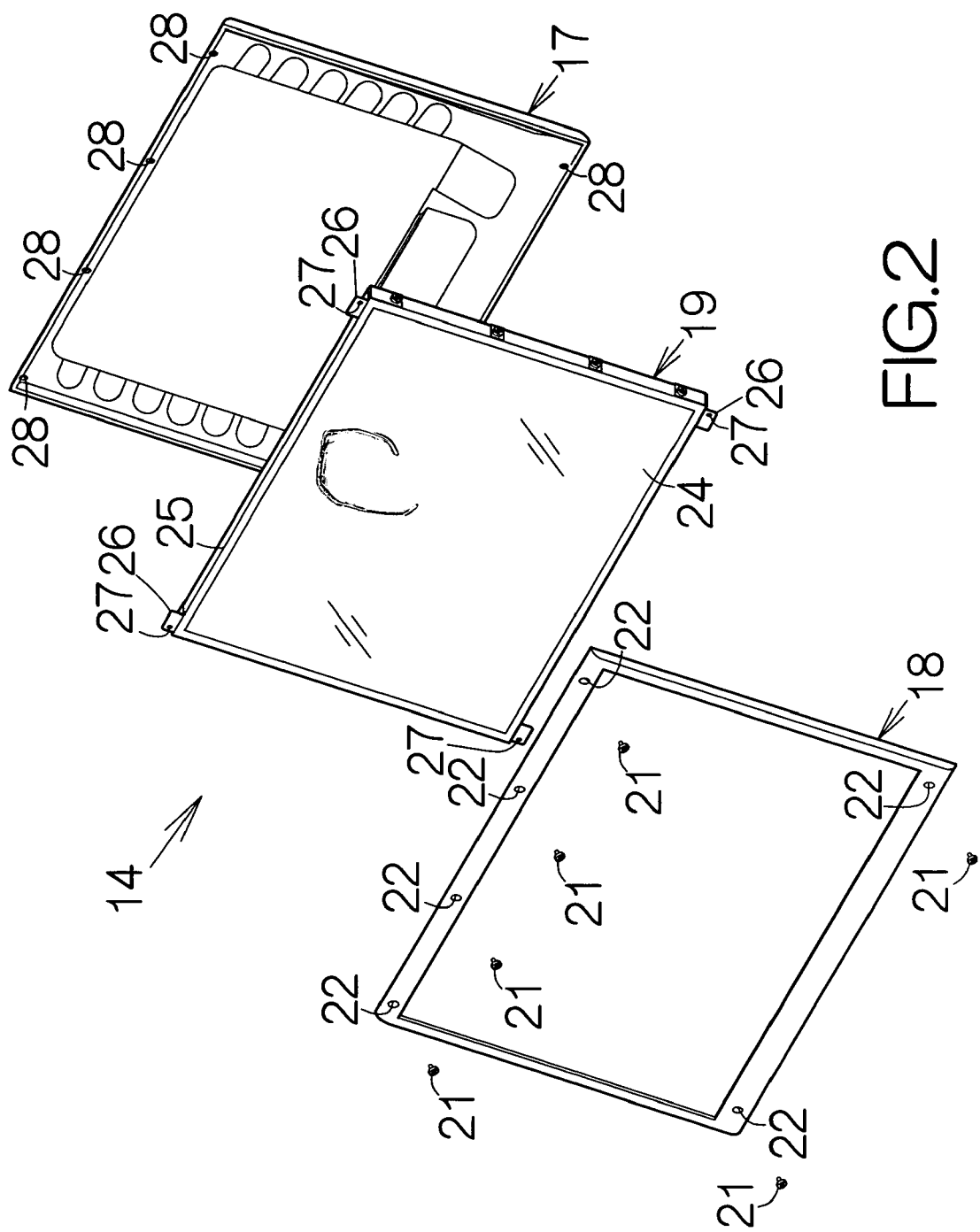
FIG. 2 is an exploded perspective view schematically illustrating a base, a liquid crystal display (LCD) panel unit, and a cover.

As shown in FIG. 2, screws 21 are screwed into the display enclosure 14 to couple the cover 18 with the base 17. The longitudinal central axes of the screws 21 are aligned with the direction perpendicular to the screen of the LCD panel unit 19. The screws 21 are inserted into the display panel 14 from the front surface thereof. Through holes 22 may be defined in the cover 18 to receive the insertion of the screws 21. The through holes 22 may be covered with dressing members, not shown.

The LCD panel unit 19 includes a LCD panel 24 and a frame member or bezel 25 surrounding the peripheral outward surfaces of the LCD panel 24. Tabs 26 are formed in the LCD panel unit 19. The tabs 26 are allowed to extend outward from the peripheral outward surfaces of the bezel 25. Through holes 27 are defined in the respective tabs 26 so as to receive the insertion of the screws 21. Specifically, the through holes 27 extend in the direction perpendicular to the screen of the LCD panel 24. On the other hand, screw bores 28 are formed in the base 17 so as to receive the corresponding screws 21. The screws 21 serve to establish the connection of the LCD panel unit 19, the cover 18 and the base 17 in this manner.

Figure 3:
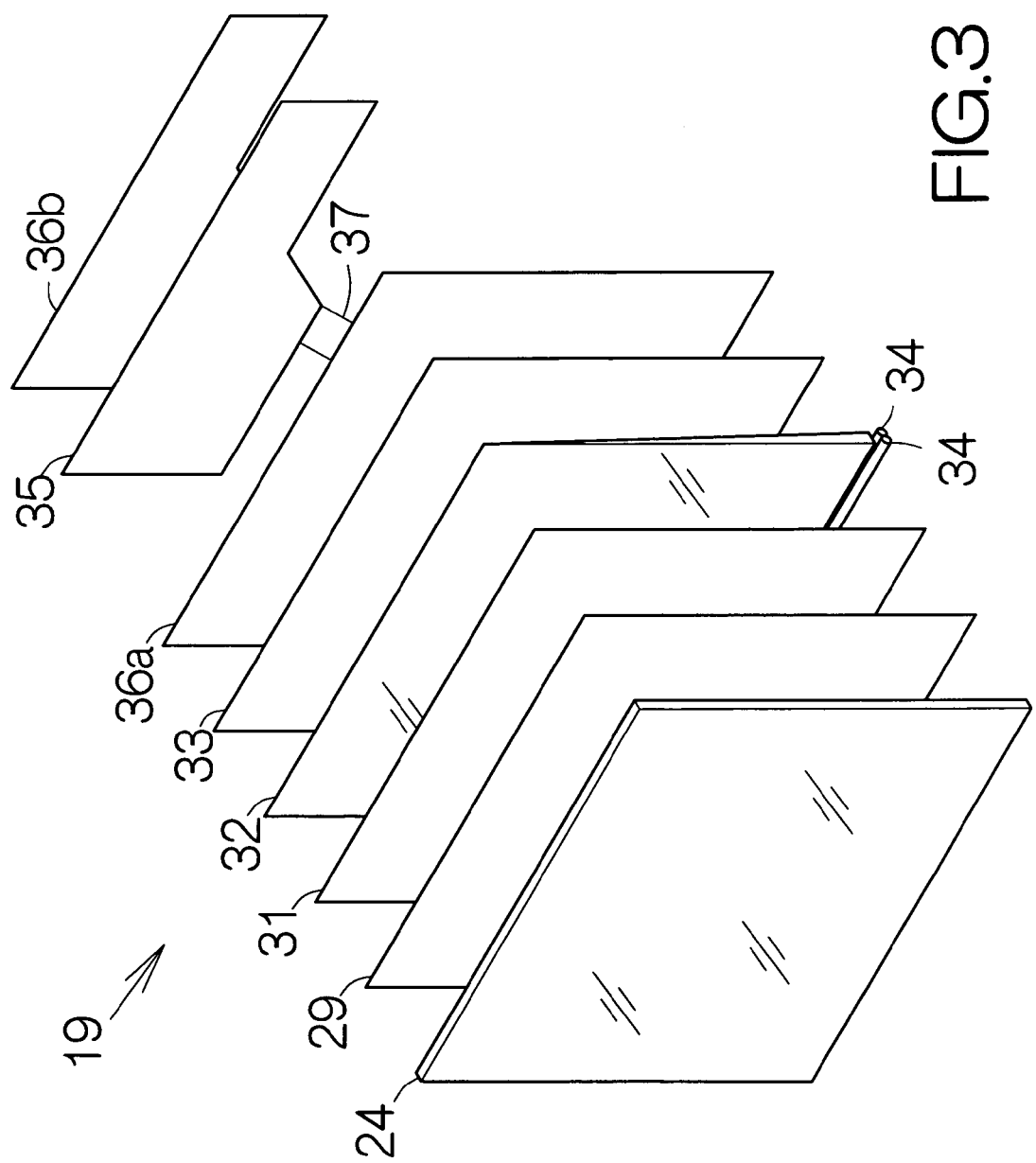
FIG. 3 is an exploded perspective view schematically illustrating the structure of the LCD panel unit.

The LCD panel 24 is placed in a space defined by the bezel 25 in the LCD panel unit 19. As shown in FIG. 3, the LCD panel 24 includes a pair of rectangular glass substrates holding liquid crystal cells therebetween, for example. The individual liquid crystal cells correspond to the pixels of the screen. Panel-shaped module components such as a diffuser 29, a prism plate 31, a light guide plate 32, a reflector 33 are superposed on the back of the LCD panel 24 in this sequence, for example. A pair of fluorescent tubes 34, 34 are disposed adjacent the end of the light guide plate 32, for example. The light guide plate 32 serves to spread the light from the fluorescent tubes 34, 34 uniformly all over the LCD panel 24 as conventionally known. A circuit board 35 is placed behind the reflector 33 for controlling the display. The circuit board 35 is interposed between front and rear insulating sheets 36a, 36b. A flexible printed circuit board 37 is connected to the circuit board 35. The bezel 25 serves to couple the LCD panel 24, the module components 29, 31, 32, 33 and the insulating sheets 36a, 36b all together. The bezel 25 may be a one-piece member. Alternatively, the bezel 25 may be comprised of separate members corresponding to the respective sides of the LCD panel 24.

Figure 4:
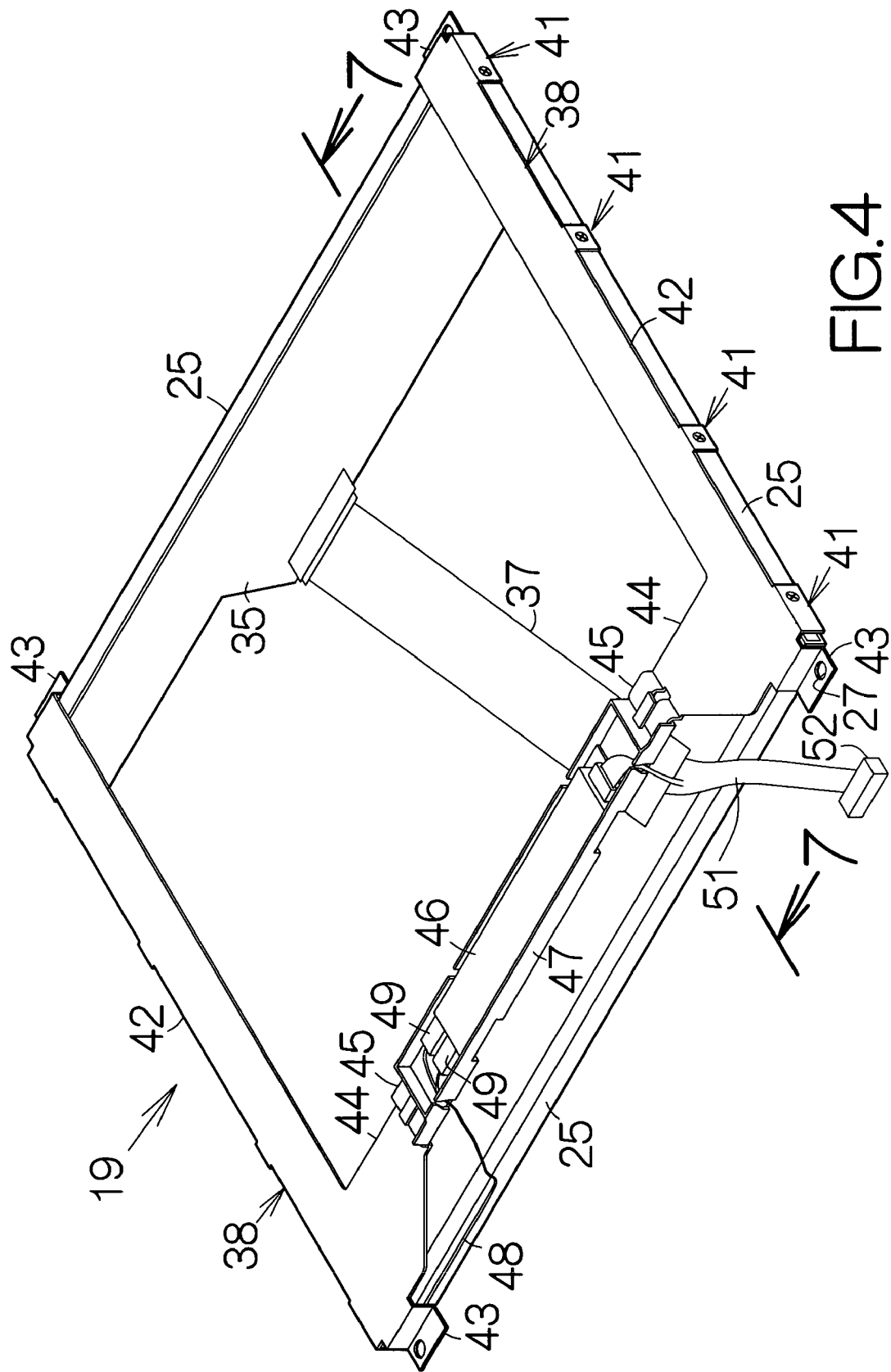
FIG. 4 is a perspective view of the LCD panel unit for schematically illustrating the back of the LCD panel unit.

As shown in FIG. 4, a pair of brackets 38, 38 are attached to the LCD panel unit 19. The brackets 38, 38 are coupled to the corresponding peripheral outward surfaces of the LCD panel 24 at the short sides of the rectangular LCD panel 24 with coupling mechanisms 41. The bracket 38 includes a first plate member 42 extending along the back surface of the LCD panel 24. The first plate member 42 is allowed to extend along the short side of the rectangular LCD panel 24. Second plate members 43 are connected to the first plate member 42. The second plate members 43 may be established by folding parts of the first plate member 42. The second plate members 43 correspond to the aforementioned tabs 26. The second plate members 43 are allowed to stand from the peripheral outward surfaces of the LCD panel 24 at the long sides of the rectangular LCD panel 24.

A metal plate such as a galvanized iron may be employed to form the bracket 38, for example. The employment of the metal plate insures a sufficient rigidity of the bracket 38 irrespective of a reduced thickness. Moreover, the bracket 38 made of a metal material may serve to establish electrostatic discharge (ESD) effect, electromagnetic interference (EMI) effect, heat radiation effect, and the like.

A third plate member 44 is likewise connected to the individual first plate member 42. The third plate member 44 extends along the back surface of the LCD panel 24. The third plate members 44 approach each other on the back surface of the LCD panel 24. A plate piece 45 is connected to the third plate member 44. The plate piece 45 extends in parallel with the back surface of the LCD panel 24. A step serves to distance the plate piece 45 from the back surface of the LCD panel 24.

A carrying member 47 is connected between the plate pieces 45, 45. The carrying member 47 is designed to carry an attached component, namely an inverter board 46. The inverter board 46 is fitted into a space defined in the carrying member 47. Here, a predetermined gap may be established between the carrying member 47 and the LCD panel 24. The carrying member 47 may be made of an insulating material such as a resin material. Molding process may be employed to form the carrying member 47. The carrying member 47 is placed in a space between the inverter board 46 and the LCD panel 24. The LCD panel 24 can reliably be insulated from the inverter board 46.

A transformer, not shown, is attached to the inverter board 46 so as to momentarily raise the voltage. The inverter board 46 is designed to supply the alternating current to the fluorescent tubes 34 in the LCD panel unit 19. Wires 48 and connectors 49, 49 are employed to electrically connect the inverter board 46 and the fluorescent tubes 34, for example. The wires 48 extend with in the LCD panel unit 19 along the periphery of the LCD panel 24. A connector 52 is utilized to connect wires 51 from the inverter board 46 with the motherboard within the main equipment 12, for example. The aforementioned flexible printed circuit board 37 is connected to the connector 52. Driving signals are supplied through the flexible printed circuit board 37 from the motherboard in the main equipment 12. A display controller circuit established on the circuit board 35 is designed to receive the driving signals. The display controller circuit controls the action of the individual liquid crystal cells based on the supplied driving signals.

Figure 5:
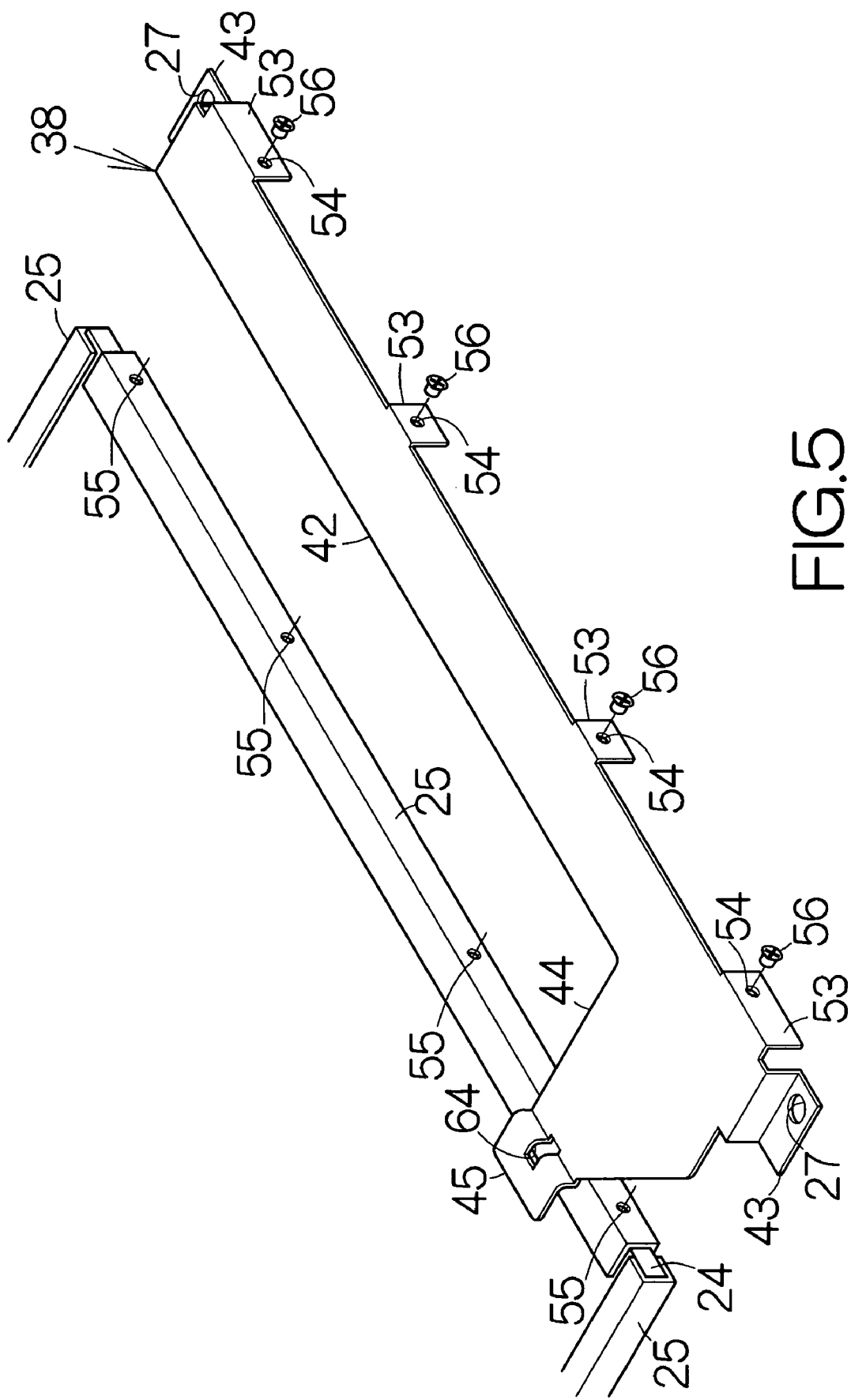
FIG. 5 is an enlarged perspective view schematically illustrating a bracket.

As shown in FIG. 5, fixation tabs 53 are connected to the first plate member 42. The fixation tabs 53 may be folded from the first plate member 42. The fixation tabs 53 are superposed on the LCD panel 24 at the peripheral outward surface of the short side. Through bores 54 are formed in the individual fixation tabs 53. Screw bores 55 are likewise formed in the peripheral outward surface of the bezel 25 at locations corresponding to the through bores 54. The screw bores 55 extend in a direction perpendicular to the peripheral outward surface of the LCD panel 24. Screws 56 are screwed into the corresponding screw bores 55 through the corresponding through bores 54. The brackets 38 are fixed on the LCD panel 24 in this manner. The screw bore 55 and the screw 56 in combination serve as a coupling mechanism 41 according to the present invention.

Figure 6:
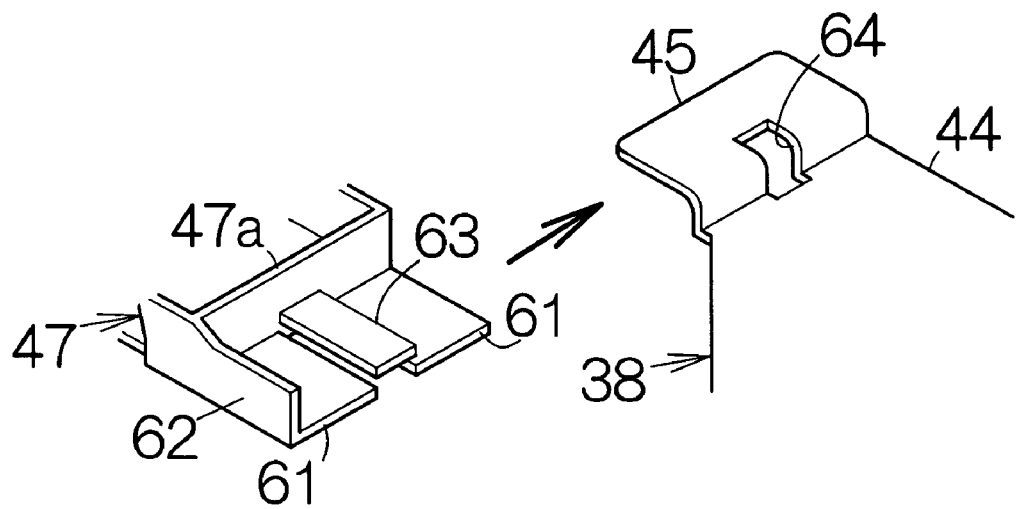
FIG. 6 is an enlarged partial perspective view for schematically illustrating a carrying member attached to the bracket.
Figure 7:
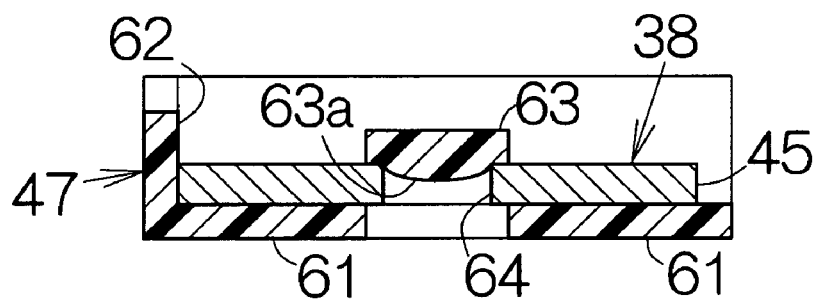
FIG. 7 is a sectional view taken along the line 7-7 in FIG. 4.

Next, a detailed description will be made on the structure for coupling the brackets 38 with the carrying member 47. As shown in FIG. 6, a pair of first plates 61, 61 are formed in the carrying member 47. The first plates 61 extend outward from the side wall 47a of the carrying member 47. A predetermined horizontal plane is continuously defined over the surfaces of the first plates 61, 61. A second plate 62 is connected to one of the first plates 61. The second plate 62 stands upright on the surface of the first plate 61. Here, the second plate 62 is connected to one end of the side wall 47a of the carrying member 47. A third plate 63 is opposed to the surfaces of the first plates 61. The third plate 63 extends outward from the side wall 47a of the carrying member 47. The third plate 63 is designed to extend in parallel with the first plates 61, 61. The third plate 63 has elasticity to some extent. A protrusion 63a is formed on the lower surface, opposed to the first plates 61, 61, of the third plate 63, as shown in FIG. 7. The protrusion 63a is designed to swell on the surface of the third plate 63 toward the first plates 61, 61. The protrusion 63a is received in an opening 64 defined in the plate piece 45 when the carrying member 47 is coupled to the brackets 38. In this case, the lower surface of the plate piece 45 is received on the surfaces of the first plates 61, 61 over the aforementioned horizontal plane. The side of the plate piece 45 is received on the second plate 62. The tip end of the plate piece 45 is received against the side wall 47a. The carrying member 47 is in this manner coupled to the brackets 38. A single plate may be employed in place of the combination of the first plates 61, 61, for example.

Figure 8:
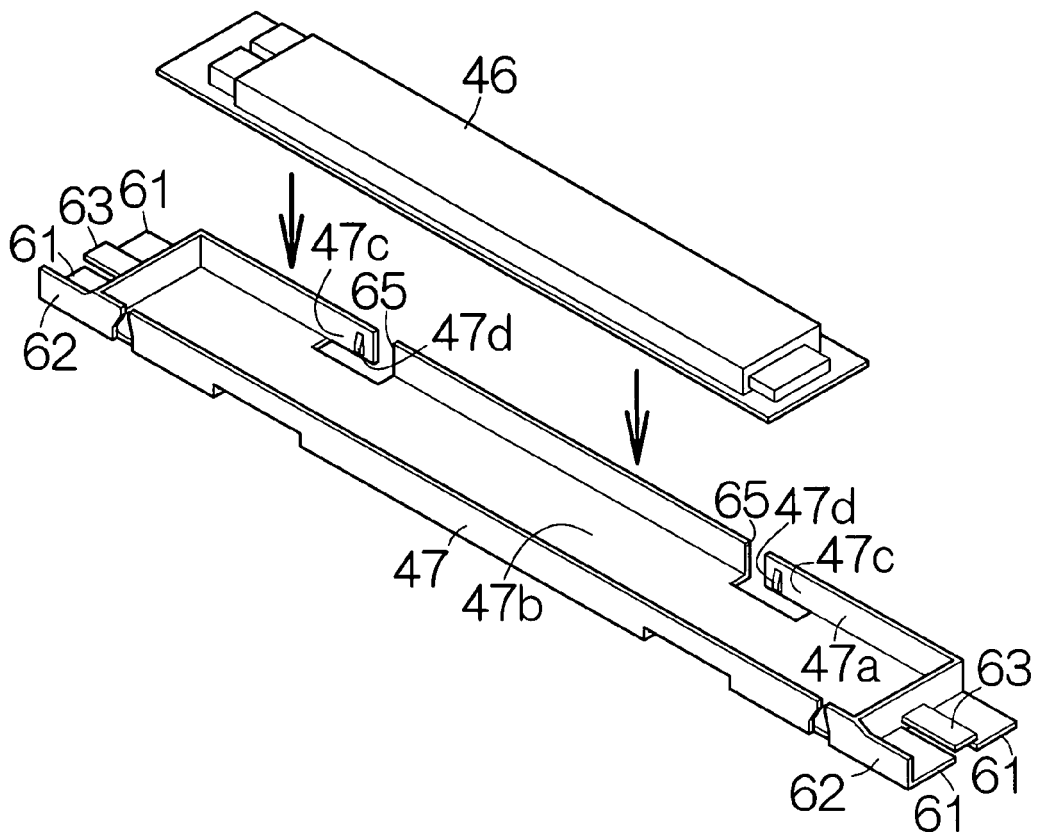
FIG. 8 is an exploded perspective view schematically illustrating the structure of the carrying member and an inverter board.

Next, a detailed description will be made on the structure for fitting the inverter board 46 into the carrying member 47. As shown in FIG. 8, a pair of recesses 65, 65 are formed in the side wall 47a and a bottom plate 47b of the carrying member 47. Extended walls 47c are formed in the individual recesses 65, 65 so as to extend from the side wall 47a. Engagement pieces 47d are allowed to protrude inward from the inner surfaces of the extended walls 47c, respectively. The engagement pieces 47d have a slant remote from the extended walls 47c at locations closer to the bottom plate 47b. When the inverter board 46 is inserted into a space within the carrying member 47, the inverter board 46 is allowed to slide on the engagement pieces 47d. The slant on the engagement pieces 47d forces the extended walls 47c to elastically deform outward from the carrying member 47. When the inverter board 46 is finally received in the space of the carrying member 47, the inverter board 46 has gotten beyond the engagement pieces 47d so that the engagement pieces 47d are allowed to engage the inverter board 46. The inverter board 46 is thus reliably held in the carrying member 47.

Figure 9:
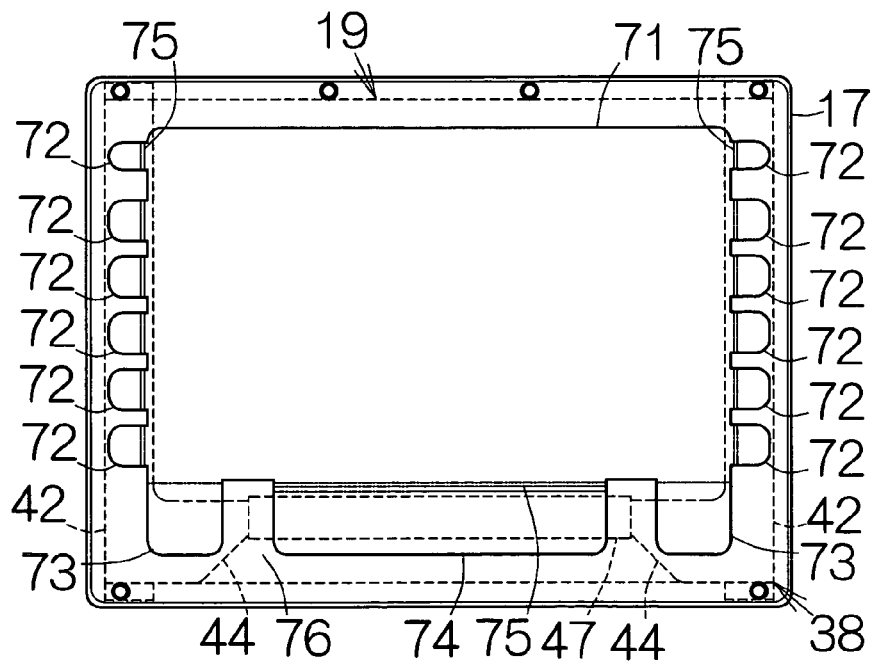
FIG. 9 is a plan view of the base for schematically illustrating a metal plate.

As shown in FIG. 9, a metal plate 71 is attached to the base 17. First fins 72 are defined in the metal plate 71 at the opposite sides to extend toward the side walls of the short sides of the base 17. A pair of second fins 73 are defined in the base 71 at the other side to extend toward the side wall of the long side of the base 17. A third fin 74 are likewise defined in the base 71 at the other side to extend toward the side wall of the long side of the base 17. The first and second fins 72, 73 are folded or bent to get distanced from the base 17 at their tip ends. A depression 76 is defined in the base 17 at a location corresponding to the third fin 74. The third fin 74 are folded or bent to get closer to the cover 17 within the depression 76. The aforementioned carrying member 47 is received in the depression 76. The metal plate 71 may be made of a metal material such as aluminum, for example.

When the LCD panel unit 19 is attached to the base 17, the LCD panel unit 19 is urged against the metal plate 71. The first fins 72 are allowed to elastically contact the first plate members 42 of the brackets 38. The second fins 73 are likewise allowed to elastically contact the third plate member 44. The inverter board 46 in the carrying member 47 is opposed to the third fin 74. Heat of the LCD panel 24 and the inverter board 46 can be transmitted to the metal plate 71. Since the metal plate 71 extends mostly all over the cover 17, the heat efficiently diffuses over the metal plate 71. The LCD panel 24 and the inverter board 46 can be prevented from rise in temperature. Additionally, the metal plate 71 also functions as an electromagnetic shield.

Figure 10:
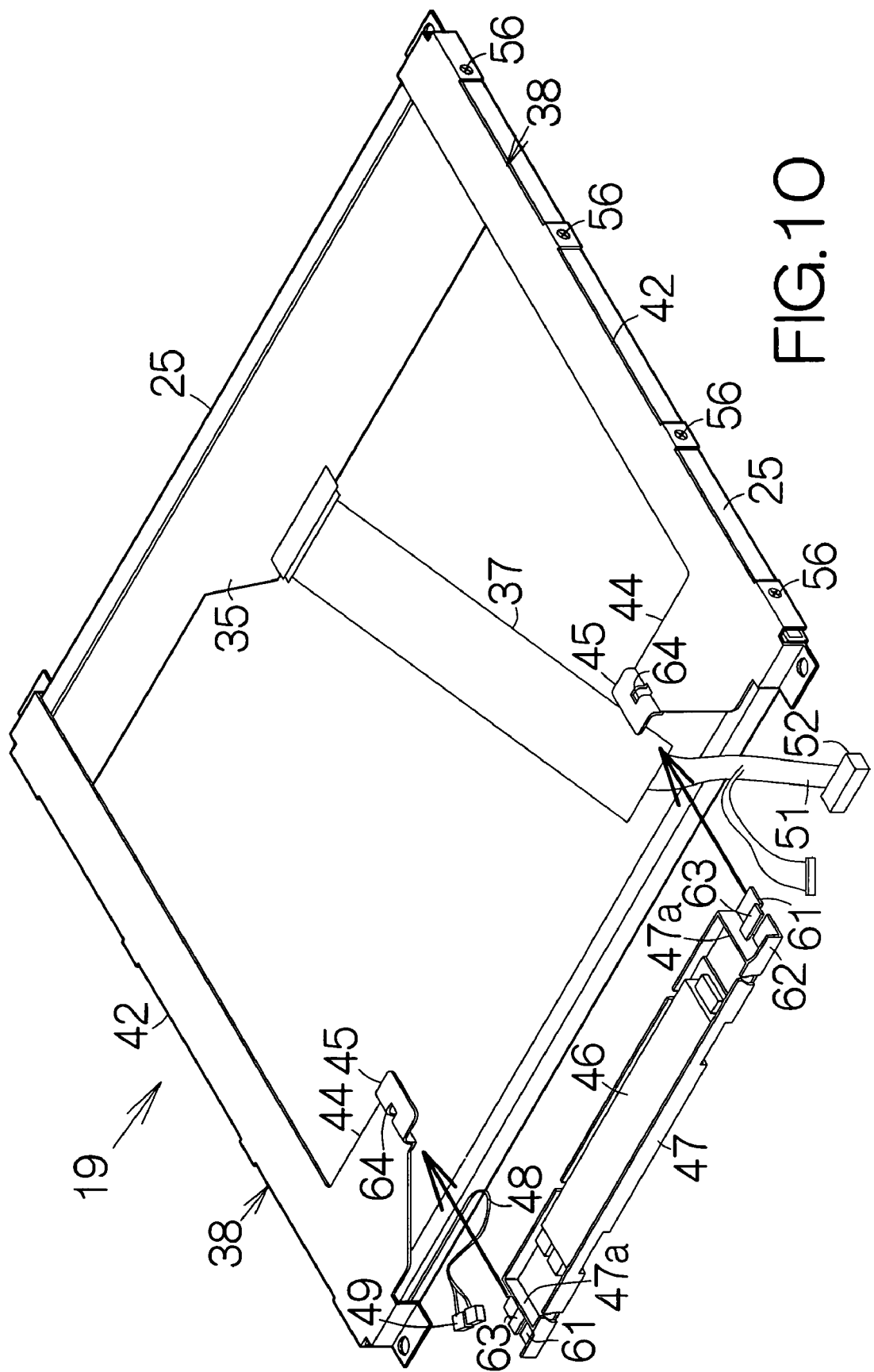
FIG. 10 is a perspective view of the LCD panel unit for schematically illustrating the carrying member to be attached to the brackets.

Next, a brief description will be made on an assembling process of the LCD panel unit 19. As shown in FIG. 10, the brackets 38 are respectively coupled to the peripheral outward surfaces of the bezel 25 with the screws 56. The flexible printed circuit board 37 is connected to the circuit board 35. The wires 51 and the connector 52 is placed outside the LCD panel 24.

Figure 11:
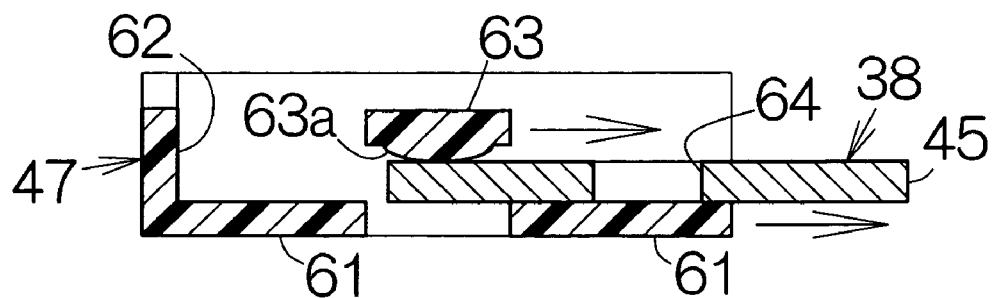
FIG. 11 is a sectional view, corresponding to FIG. 7, schematically illustrating the carrying member when the carrying member is attached to the brackets.

The carrying member 47 is thereafter received on the plate pieces 45 in parallel with the back surface of the LCD panel 24 from the outside of the LCD panel 24. The inverter board 46 has previously been fitted in the carrying member 47. The connector 49 and the wires 51 have likewise been connected to the inverter board 46. As shown in FIG. 11, the first plates 61 are allowed to slide along the lower surfaces of the plate pieces 45. The protrusions 63a of the third plates 63 are received on the upper surfaces of the corresponding plate pieces 45. The protrusions 63a forces the third plates 63 to elastically deform. When the carrying member 47 is then further allowed to slide, the first and third plates 61, 63 move in parallel with the plate pieces 45. In this manner, the plate pieces 45 serve to establish the guide passages of the first and third plates 61, 63, namely of the carrying member 47.

The protrusions 63a are then received in the corresponding openings 64 in the plate pieces 45, as shown in FIG. 7. The movement of the carrying member 47 is restrained in the guide passages. Removal or drop of the carrying member 47 can thus be prevented. Specifically, the protrusions 63a and the openings 64 in combination serve as a restraint mechanism according to the present invention. Simultaneously, the second plates 62 are received on the side surfaces of the corresponding plate pieces 45. In this case, the side walls 47a of the carrying member 47 are respectively opposed to the tip ends of the corresponding plate pieces 45. The lateral movement of the carrying member 47 is thus restrained in the direction perpendicular to the guide passages. The brackets 38 and the carrying member 47 in combination serve as an attachment member according to the present invention.

The LCD panel unit 19 is then attached to the base 17. The LCD panel unit 19 is reversed before the attachment. Since the flexible printed circuit board 37 is interposed between the LCD panel 24 and the carrying member 47, the flexible printed circuit board 37, the wires 51 and the connector 52 are reliably prevented from fluttering. The worker can easily superpose the LCD panel unit 19 on the base 17 without hindrance of the flexible printed circuit board 37, the wires 51 and the connector 52. The cover 18 is then placed over the LCD panel unit 19 on the base 17. Assembling of the display enclosure 14 is in this manner completed. The connector 52 is finally connected to the motherboard within the main equipment 12.

The brackets 38 and the carrying member 47 are fixed on the peripheral outward surfaces of the bezel 25 in the aforementioned LCD panel unit 19. The screws 56 in the direction perpendicular to the corresponding peripheral outward surfaces are utilized to fix the brackets 38. Additionally, the carrying member 47 is allowed to simply slide on the brackets 38 along the guide passages on the plate pieces 45 when the carrying member 47 is coupled to the brackets 38. The carrying member 47 is forced to move in parallel with the back surface of the LCD panel 24. No urging forces are applied to the LCD panel in the direction perpendicular to the back surface of the LCD panel 24. The LCD panel 24 is reliably prevented from suffering from damages or breakage. Moreover, the attached component such as the inverter board 46 is carried on the carrying member 47. The carrying member 47 can be coupled to the brackets 38 without any coupling mechanism such as screws, as described above. This contributes to an easier assembling of the LCD panel unit 19.

For example, a pair of fluorescent tubes are often incorporated in a LCD panel unit. In this case, the inverter board is forced to include sets of transformers and circuit boards, for example. The inverter board tends to get larger in size. The carrying member 47 carrying the inverter board 46 is placed behind the LCD panel 24 in the aforementioned LCD panel unit 19. The peripheral size of the display enclosure 14 can be reduced. If the inverter board 46 is placed adjacent the outer periphery of the LCD panel 24 in a conventional manner, the peripheral size of the display enclosure should get larger.

The third plate member 44 may be omitted from the LCD panel unit 19, for example. In this case, the plate pieces 45 may directly be connected to the first plate members 42. The lateral width or size of the carrying member 47 may be set corresponding to the distance between the plate pieces 45. Otherwise, the carrying member 47 may extend to cover all over the back surface of the LCD panel 24, for example. In this case, the size of the depression 76 may be set corresponding to the size of the carrying member 47. The attached component may include, in addition to the aforementioned inverter board 46, an antenna, any component related to an antenna and/or a remote controller, or the like. The display enclosure 14 of the type may be utilized to enclose any type of a panel member other than the aforementioned LCD panel 24. The display enclosure 14 of the type may be utilized in electronic apparatuses other than the notebook type personal computer.

Screws, an adhesive, or the like may be employed to couple the carrying member 47 to the brackets 38 in the LCD panel unit 19. In this case, the brackets 38 may be coupled to the peripheral outward surfaces of the bezel 25 after connection has been completed between the carrying member 47 and the brackets 38. Urging forces on the screws 56 may be applied to the peripheral outward surfaces of the LCD panel 24 only in the directions perpendicular to the corresponding peripheral outward surfaces. The LCD panel 24 can be prevented from suffering from damages or breakage.

Figure 12:
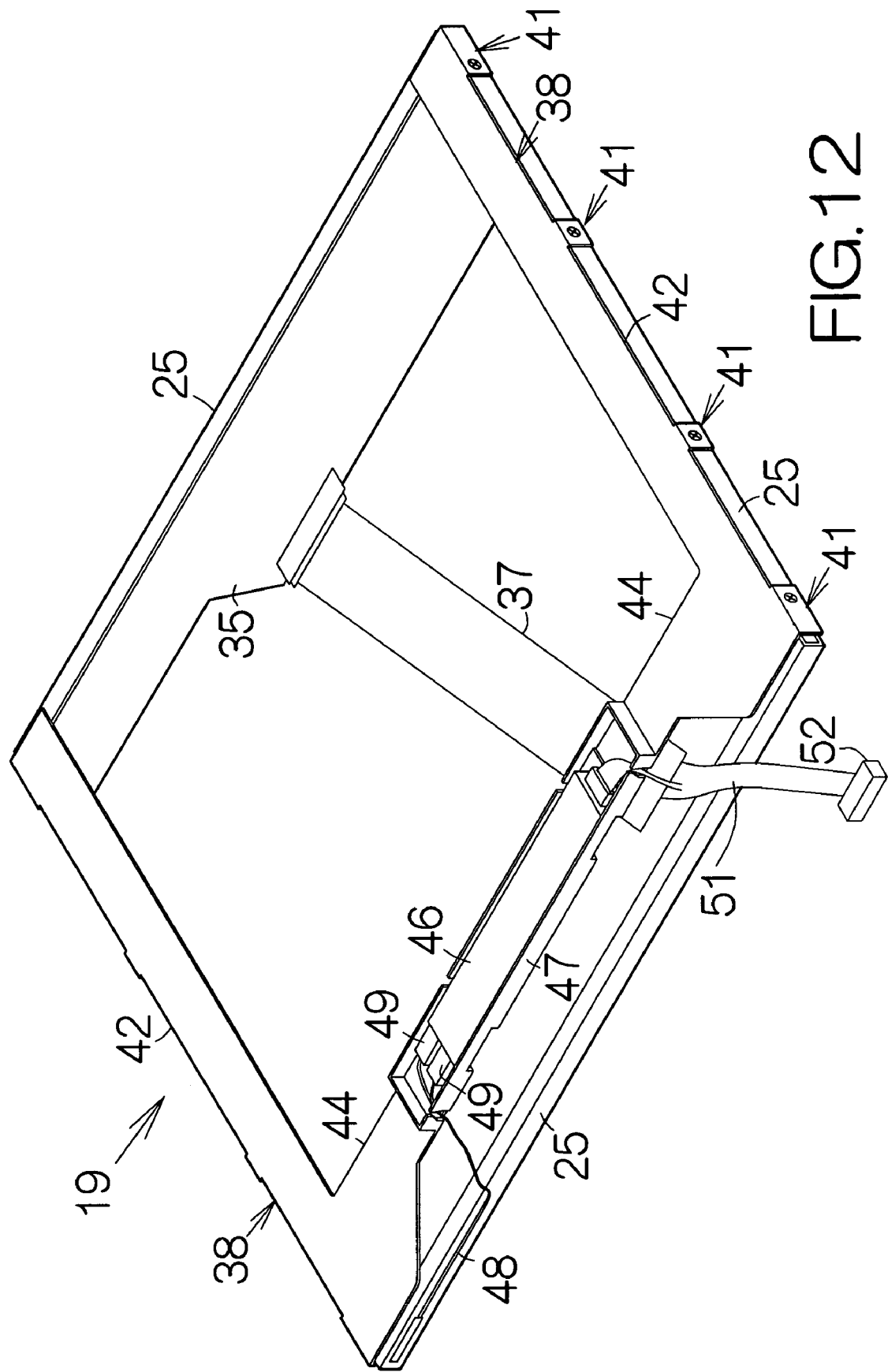
FIG. 12 is a perspective view of the LCD panel unit for schematically illustrating a modification to the carrying member and the brackets.

Furthermore, the brackets 38 are prepared separately from the carrying member 47 as described above. The brackets 38 can solely be replaced. If the brackets 38 are prepared to reflect the size and/or shape of the LCD panel 24, the carrying member 47 can reliably be coupled to the LCD panel 24 of various size and shapes. Otherwise, the carrying member 47 may be integral to the brackets 38, as shown in FIG. 12. Molding process may be employed to form an integral body of the carrying member 47 and the brackets 38, for example, based on a resin material. If the coupling mechanism is employed to couple the brackets 38 to the bezel 25 as described above, the carrying member 47 can be placed behind the LCD panel 24. Urging forces may be applied to the peripheral outward surfaces of the LCD panel 24 only in the directions perpendicular to the corresponding peripheral outward surfaces. The LCD panel 24 can be prevented from suffering from damages or breakage. Moreover, the integral body of the carrying member 47 and the brackets 38 is expected to lead to reduction in the production cost. In general, a light-weighted small LCD panel unit is employed in a cellar phone, a portable digital assistant (PDA), and the like. Such a small LCD panel unit requires a precise molding. The employment of molding process contributes to establishment of the precise molding of the brackets 38. In this case, a double-sided adhesive tape may be employed in place of the screws 56 to couple the brackets 38, for example.

What is claimed is:

1. A panel member unit comprising:
    a panel member having a front surface, a back surface and a peripheral outward surface defined between the front surface and the back surface;
    a frame member fixedly placed on the peripheral outward surface of the panel member;
    a bracket superposed on the peripheral outward surface of the panel member, the bracket being coupled to the frame member with a predetermined coupling mechanism;
    a carrying member receiving an attached component, the carrying member configured to move on the bracket along a guide passage extending along the back surface of the panel member; and
    a restraint mechanism configured to restrain movement of the carrying member in the guide passage.

2. The panel member unit according to claim 1, wherein the coupling mechanism comprising:
    a screw bore formed in the frame member in a direction perpendicular to the peripheral outward surface of the panel member; and
    a screw penetrating through the bracket, the screw being screwed into the screw bore.

3. The panel member unit: according to claim 2, wherein a screw bore is formed in the bracket in a direction perpendicular to the back surface of the panel member.

4. The panel member unit according to claim 1, wherein the bracket is made of a metal plate.

5. The panel member unit according to claim 1, wherein said panel member is a display panel.

6. The pane member unit according to claim 5, wherein said attached component includes an inverter board connected to the display panel.

7. The panel member unit according to claim 6, wherein said carrying member is made of an insulating material.

8. The panel member unit according to claim 1, wherein the frame is disposed between the peripheral outward surface of the panel member and the bracket.

9. The panel member unit according to claim 1, wherein the carrying member includes a bottom plate receiving the attached component, and the bottom plate extends along the back surface of the panel member.

10. The panel member unit according to claim 9, wherein an aerial space is defined between the bottom pie of the carrying member and the back surface of the panel member.

11. The panel member unit according to claim 10, further comprising
a circuit board placed along the back surface of the panel member, wherein
a flexible printed circuit board connected to the circuit board passes through the aerial space.

12. An electronic apparatus comprising:
an enclosure;
a display panel contained within the enclosure, the display panel having a front surface, a back surface and a peripheral outward surface defined between the front surface and the back surface;
a frame member fixedly placed on the peripheral outward surface of the display panel;
a bracket superposed on the peripheral outward surface of the display panel, the bracket being coupled to the frame member with a predetermined coupling mechanism;
a carrying member receiving an attached component, the carrying member configured to move on the bracket along a guide passage extending along the back surface of the display panel; and
a restraint mechanism configured to restrain movement of the carrying member in the guide passage.

13. The electronic apparatus according to claim 12, wherein said coupling mechanism comprising:
a screw bore formed in the frame member in a direction perpendicular to the peripheral outward surface of the display panel; and
a screw penetrating through the bracket, the screw being screwed into the screw bore.

14. The electronic apparatus according to claim 13, wherein a screw bore is formed in the bracket in a direction perpendicular to the back surface of the display panel.

15. The electronic apparatus according to claim 12, wherein said bracket is made of a metal plate.

16. The electronic apparatus according to claim 12, wherein said attached component includes an inverter board connected to the display panel.

17. The electronic apparatus according to claim 16, wherein said carrying member is made of an insulating material.

18. The electronic apparatus according to claim 12, further comprising main equipment including a processor circuit, said enclosure coupled to the main equipment for relative swinging movement.

19. An attachment member coupled to a frame member, the frame member being fixedly placed on a peripheral outward surface of a panel member, the attachment member comprising:
a bracket superposed on the peripheral outward surface of the panel member, the peripheral outward surface being defined between a front surface and a back surface of the panel member, the bracket being coupled to the frame member with a predetermined coupling member;
a carrying member receiving an attached component, the carrying member configured to move on the bracket along a guide passage extending along the back surface of the panel member; and
a restraint mechanism configured to restrain movement of the carrying member in the guide passage.

20. The attachment member according to claim 19, wherein said coupling member comprising:
a screw bore formed in the frame member in a direction perpendicular to the peripheral outward surface of the panel member; and
a screw penetrating through the bracket, the screw being screwed into the screw bore.

21. The attachment member according to claim 20, wherein a screw bore is formed in the bracket in a direction perpendicular to the back surface of the panel member.

22. The attachment member according to claim 19, wherein said bracket is made of a metal plate.

23. The attachment member according to claim 19, wherein said panel member is a display panel.

24. The attachment member according to claim 23, wherein said attached component includes an inverter board connected to the display panel.

25. The attachment member according to claim 24, wherein said carrying member is made of an insulating material.

* * * * *